United States Patent

Andresen et al.

[15] 3,670,304

[45] June 13, 1972

[54] METHOD AND APPARATUS FOR DETECTING ERRORS READ FROM MOVING-MAGNETIC-STORAGE DEVICE WITH DIGITAL INTERFACE

[72] Inventors: Rolf Andresen, Broomfield; Benjamin C. Fiorino, Longmont; Fred W. Niccore, Boulder, all of Colo.

[73] Assignee: International Business Machines Corporation, Armonk, N.Y.

[22] Filed: Sept. 28, 1970

[21] Appl. No.: 76,143

[52] U.S. Cl.........................340/146.1 F, 328/115, 328/162, 340/146.1 AX, 340/174.1 B

[51] Int. Cl.........................G06k 5/00

[58] Field of Search........340/146.1 AG, 146.1 AX, 146.1 F, 340/169, 172, 174.1 B; 328/115, 162; 307/235

[56] References Cited

UNITED STATES PATENTS

| | | | |
|---|---|---|---|
| 3,214,700 | 10/1965 | Hook | 328/115 X |
| 3,430,197 | 2/1969 | Brown | 340/146.1 |
| 3,534,273 | 10/1970 | Thomas | 307/235 |

*Primary Examiner*—Charles E. Atkinson
*Attorney*—Hanifin and Jancin

[57] ABSTRACT

A data signal read from magnetic tape is converted from an analog signal into a digital signal by hard limiting. This hard-limited data signal is combined with an indication as to whether the amplitude of the digital signal is above a predetermined threshold and then passed to the control unit operating with the tape drive. The control unit, in turn, detects the data, checks for parity error, phase error, and amplitude error and provides control signals back to the tape drive. These control signals are used to change the predetermined threshold used by the tape drive. The predetermined threshold is changed by these control signals in accordance with detection of a history of good data and in accordance with errors in the record block.

16 Claims, 7 Drawing Figures

INVENTORS
ROLF ANDRESEN
BENJAMIN C. FIORINO
FRED W. NICCORE

BY Homer L. Knearl

ATTORNEY

METHOD AND APPARATUS FOR DETECTING ERRORS READ FROM MOVING-MAGNETIC-STORAGE DEVICE WITH DIGITAL INTERFACE

CROSS-REFERENCE TO RELATED APPLICATION

Application Ser. No. 76,144, entitled "Method and Apparatus for Sensing and Data Gating in a Moving-Magnetic-Storage Device with Digital Interface," by Rolf Andresen, filed concurrently herewith, and assigned to the same assignee as the present application, teaches and claims the amplitude sense and data gating apparatus and method used as a portion of the present invention.

BACKGROUND OF THE INVENTION

1. Field of the Invention

The invention relates to the method and apparatus for detecting the presence of errors in data tracks on a moving magnetic storage device, such as a tape drive or a disk file. More particularly, the invention relates to the detection of errors and the cooperation and control across a digital interface between a tape drive or disk file and its associated control unit.

2. Description of the Prior Art

The interface between tape drives and control units has almost always been analog. The control unit was designed to utilize, not only the binary information in the analog waveform, but also, the amplitude of the analog waveform.

The amplitude of the analog waveform was utilized in two ways — for error correction and for detection of when a record block was being encountered by the transducer. The error detection was accomplished by using threshold circuits to monitor the amplitude of the signal received from the tape drive. If the particular signal for a given track went below a predetermined threshold, an error was indicated for that track. A parity check was also made to detect parity error. The parity error in combination with the error for a single track could then be used to correct the data. In a situation where more than one track went below the predetermined amplitude threshold, then a multitrack error was indicated and correction was not possible.

The amplitude of the analog signal from the tape drive was also used in the detection of the beginning of a record block. The control unit would look for a series of strong amplitude signals at the beginning of the record block. In effect, an envelope-type of detection was used whereby after a certain number of preamble bits in a record block had been received, the envelope detector would indicate that a record block was present.

As is well known, the record block for phase-encoded data consists of a preamble, data information, and a postamble. The preamble is made up of 40 zeros followed by a one, and a postamble is made up of a one followed by 40 zeros. In this way, the record block can be read in either direction, and the postamble and preamble functions are interchangeable.

It is well known in the art to utilize the preamble for the acquisition of clock signals and for the detection that a record block is present by use of envelope-type of detectors.

With the conversion to a digital interface, as taught in this invention and the copending, concurrently filed invention, Ser. No. 76,144, it was desirable to retain the error detection and record block detection functions. However, the amplitude information from a tape drive would normally be lost because of the conversion to the digital interface. The problem is, then, the conversion from an analog interface to a digital interface with the retention of and improvement of the error detection and record block detection techniques.

An additional problem with the prior art devices is that often times the amplitude error indication was too restrictive. In other words, the error detection apparatus, based on the amplitude of the waveform, would indicate that a track was in error in a situation where, although the amplitude was low, the data was still being properly detected. Thus, a related problem is the detection of only true and valid errors. In other words, indicating a dead track (bad information on a track) only where it is no longer possible to obtain valid data from the track. This is in contrast to the prior art procedure of indicating a bad track simply because a track signal goes below a predetermined amplitude.

Thus, it is an object of this invention to achieve high reliability through use of a digital interface between a tape drive and control unit and through use of improved error detection and record block detection circuits designed to operate with a digital interface.

It is another object of this invention to increase the reliability of data read from a tape drive by use of a digital interface wherein data is multiplexed with an amplitude signal and wherein an improved dead track pointer is achieved by the cooperation of the amplitude sensing apparatus in the tape drive along with the error detecting apparatus in the control unit.

SUMMARY OF THE INVENTION

In accordance with this invention, the above objects are accomplished by converting the analog data signal at the tape drive into a quasi-digital data signal which can utilize digital circuitry and by providing signal strength sensing both at the tape drive and the control unit along with apparatus in the control unit to generate control signals indicative of error conditions or good data. The signal strength sensor in the tape drive may be set at a predetermined threshold and used to gate the data signal to the control unit. Thus, if the signal strength sensor of tape drive detects the signal strength of the data signal falling below a predetermined threshold, it will inhibit the gate, and no data will flow to the control unit on a given track. This has the effect of telling the control unit that the data on that track has fallen below the predetermined threshold.

In the control unit, the data signal passed to the control unit from the tape drive is monitored by an envelope amplitude sensor to detect a history of good data. This envelope detector will also indicate amplitude error in a record block if the amplitude gradually falls out and has not been blocked at the tape drive by the signal strength sensor in the tape drive.

The control unit also contains a phase error detector and a parity error detector. Each track is monitored for phase error, and each byte is monitored for parity error. Either a phase error or a parity error indication can be utilized to vary the threshold at the signal strength sensor in the tape drive.

The envelope sensor also has an effect on the threshold used by the signal strength sensor in the tape drive, in that, if it detects a history of good data at the beginning of a record block or later in the record block, it overrides the signal strength sensor in the tape drive. This eliminates the problem in the prior art where below threshold signals were blocked unnecessarily. In the present invention, data is assumed to be good. The signal strength sensor in the tape drive will inhibit or block data from getting to the control unit only if a phase error or parity error is detected by the control unit.

In addition, the parity error and phase error signals are used in an AND gate function to set an indication of a dead track. When a parity error has been detected, if a phase error concurrently exists in one of the tracks, that track will be indicated as a dead track. This dead track information may be used by error correction apparatus to correct a byte if there is only one dead track.

The great advantage of this invention is that it has extremely high reliability, in that, it uses digital circuitry, which is inherently noise immune, and also, in that, its error correction techniques with this digital circuitry give very high reliability for data through-put. In addition, the use of digital components, such as standard logic blocks which can be massed produced as integrated circuit chips, greatly reduces the cost of the data detecting and correcting apparatus and the interface related circuits. Thus, high reliability has been achieved, and with the unexpected additional advantage of lower cost.

The foregoing and other objects, features, and advantages of the invention will be apparent from the following more particular description of the preferred embodiment of the invention, as illustrated in the accompanying drawings.

DESCRIPTION OF THE PREFERRED EMBODIMENT

Figure 1:
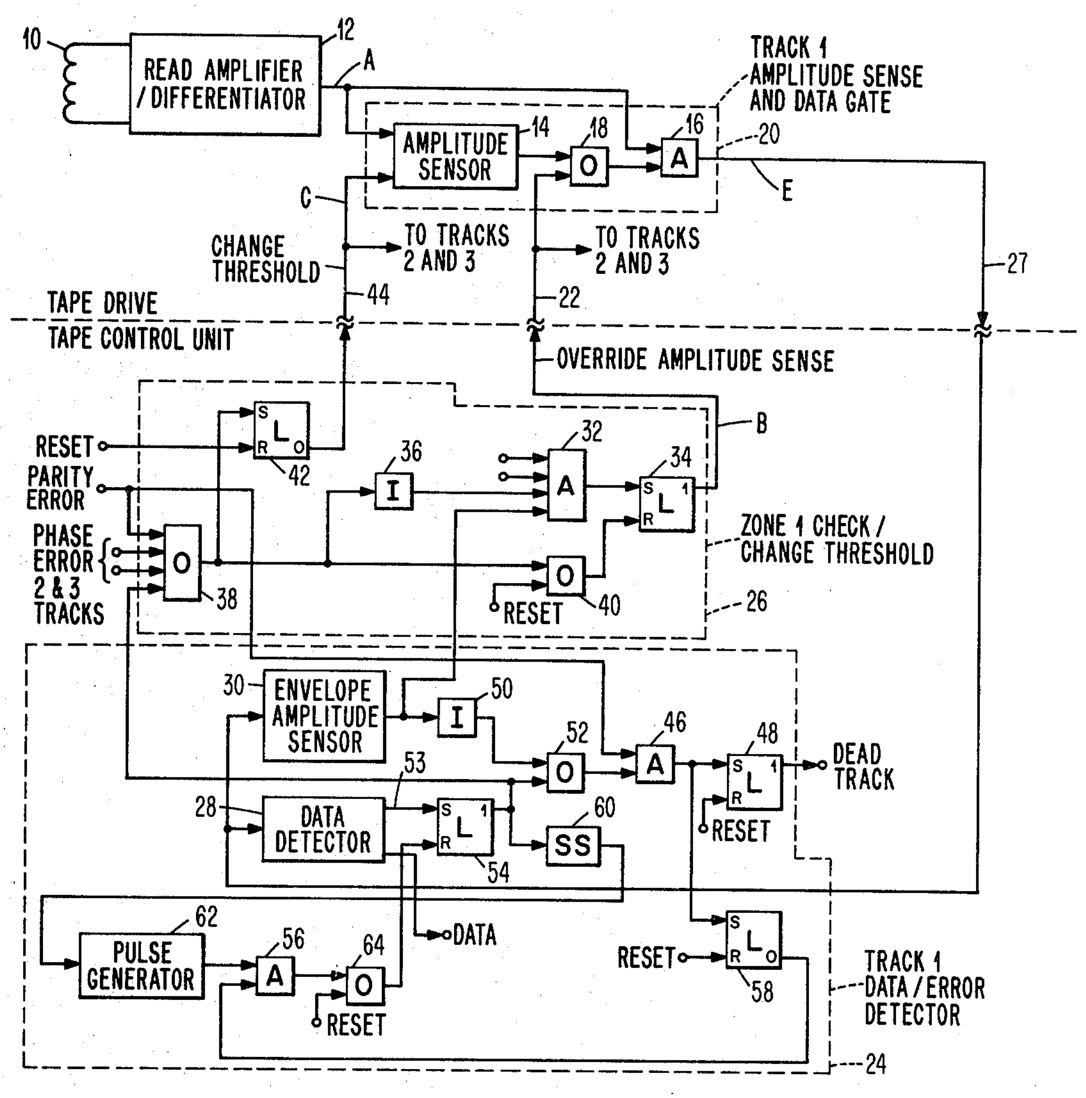
FIG. 1 shows the preferred embodiment of the invention as implemented for a single track of data and with a zone check for three tracks in the control unit.

In FIG. 1, a schematic block diagram of the preferred embodiment of the invention for one track of information is shown. Read head 10 detects the magnetic recorded signal on tape or disk and applies it to the read amplifier and differentiator circuits. These conventional preamplification circuits also include a differentiation function. The read amplifier 12 also contains a hard-limiting circuit so that the signal waveform from the amplifier 12 is a two-level signal. This assumes that the level of the signal being read by the head 10 is nominal. If the level goes below some fixed percentage of nominal (for example, 30 percent), then the amplitude of the signal is such that the hard limiting will become ineffective. In other words, the operation of the amplifier 12 starts to become linear when the signal read by the head 10 begins to go below 30 percent of the nominal signal.

The hard-limited signal out of amplifier 12, hereinafter called the digital signal, is applied to the amplitude sensor 14 and to an AND gate 16. The amplitude sensor 14 and the AND gate 16 along with an OR gate 18 make up an amplitude sense and data gate 20. Each track includes such an amplitude sense and data gate 20.

The function of the amplitude sensor 14 is to monitor the amplitude of the digital signal from the read amplifier 12. If the amplitude of this digital signal falls below a predetermined threshold, the amplitude sensor 14 will no longer have an output, and this condition is passed by OR gate 18 to inhibit AND gate 16. Thus, when the amplitude falls below the threshold, no further digital signal from amplifier 12 is passed to the tape control unit because AND gate 16 is inhibited.

Alternatively, amplitude sensor 14 may be viewed as an energy sensing device monitoring the height of data pulses over a period of time. Preferably, for good response, the sensor is adjusted so that the signal amplitude for about 1½ data pulse cycles will cause either a satisfaction of the threshold or a failure to satisfy the threshold. Whether the sensor 14 is testing for amplitude or energy in the incoming signal is a matter of choice. The significant function is that the sensor 14 is testing the strength of the data signal.

There are effectively a total of three thresholds which are available to control the AND gate 16. Two thresholds are provided by selecting the amplitude threshold to be used by the amplitude sensor 14. These thresholds are defined as high and low level and correspond to about 30 percent of nominal signal for the high level and 10 percent for the low level. Of course, other threshold levels or more threshold levels might be chosen as desired.

The third level is provided by the OR 18 and the signal on line 22. The third level and is essentially a zero level. In effect, if there is a signal, identified as an override signal, from the tape control unit on line 22, this signal is passed by OR gate 18 to enable AND gate 16. While the override signal is present, any output or lack of output from amplitude sensor 14 is ineffective. In other words, the digital signal from read amplifier 12 is gated straight through AND gate 16 irrespective of any action by the amplitude sensor 14. This effectively corresponds to setting zero-threshold level in the amplitude sensor and could be accomplished in that manner if desired. The digital signal out of AND gate 16, which is passed to the tape control unit, contains two pieces of information, one, the digital signal read by amplifier 12, and, two, a no-signal condition which indicates that the amplitude sensor has detected insufficient amplitude in the signal from amplifier 12.

The control signals used by the amplitude sense and data gate 20 are generated in the tape control unit. The tape control unit consists of a data-error detector 24 for each track and a zone check 26 for a set of three tracks. Zone checking will be described hereinafter. For purposes of FIG. 1, it is assumed that there are nine tracks being read, and that these nine tracks have been divided into three zones of three tracks each. Thus, a zone check 26, shown in FIG. 1, will monitor three tracks. The digital signal comes into the tape control unit over line 27 and is applied to a data detector 28 and an envelope amplitude sensor 30.

The envelope amplitude sensor 30 looks for a history of good amplitude in the digital signal received over line 26. If the envelope of the amplitude of the signal over line 26 is above a predetermined threshold, then the envelope amplitude sensor 30 has an output which is passed to AND gate 32 in the zone check. This signal from the envelope amplitude sensor could be called a good data signal.

AND gate 32 also monitors good data signals from the other tracks. If all tracks in the zone are indicating good data, AND gate 32 will have an output which will set latch 34. When latch 34 is set, signals from the latch will constitute the override signal which is passed back over line 22 to the tape drive. As previously pointed out, this override signal causes the amplitude sense and data gate 20 to pass all of the digital signals from amplifier 12.

AND gate 32 also has an additional input from an inverter 36. This inverter is monitoring the error condition indicated by OR 38. If there is a phase error in any of the tracks in the zone or if there is a parity error in a byte of data for all of the tracks, then OR 38 will have an output. This output from OR 38 is inverted by inverter 36 and will inhibit AND gate 32.

In addition, the output from OR gate 38 is passed by OR 40 to reset the latch 34. In other words, latch 34 is set and will generate an override signal when a good data indication has been received from all of the tracks in a zone. However, when a parity error is detected, or a phase error is detected in any track of the zone, then latch 34 is reset and the override signal is terminated. When the override signal terminates, the amplitude sensor 14 in the tape drive again participates in the gating of data through AND gate 16.

At the same time that the error signal from OR gate 38 is turning off the override signal, it is also setting latch 42 which causes the amplitude sensor to change the threshold it is using. When latch 42 is set, the signal over line 44 to the tape drive is turned off, and this causes the amplitude sensor to switch from a high-level threshold to a lower-level threshold. As previously pointed out, the high-level threshold is approximately 30 percent of nominal while the lower-level threshold is approximately 10 percent of nominal. Other values could be utilized for these thresholds. In summary, the effect of an error signal out of OR 38 is that the amplitude sensor is put back in control of the gating of data from the tape drive, and the threshold of the sensor is set at 10 percent of a nominal signal.

The indication of a dead track, i.e., a pointer to the track that is indicating error, is taken care of in the data error detector 24. This is accomplished by ANDing the parity error indication with an error — either amplitude or phase — indication in AND gate 46. If AND gate 46 is satisfied, its output will set the dead track latch 48, which will then have an output signal indicating dead track.

An amplitude error indication, where there has been a slow degrading of amplitude and no phase error has occurred, is detected by the envelope amplitude sensor 30. In effect, if this condition exists, the output of the sensor 30 will disappear and inverter 50 will then have an output which will be passed by OR 52 and satisfy one-half of the AND gate 46. Thus, if a parity error then occurs, the AND gate 46 will have an output to set the dead track latch 48.

Normally, errors will be indicated by detection of a phase error in the digital signal received from the tape drive. The phase error detection is taken care of by the data detector 28 which generates a phase-error-pulse signal on line 53 at the time it detects the phase error. This phase-error signal sets a phase error latch 54. The output of the phase error latch is the phase error signal which is utilized by the ORs 52 and 38 to indicate phase error for that track. Phase error latch 54 will stay set and continue to have a phase error indication for a predetermined time interval corresponding to several bit periods. If a parity error is detected during this interval, then the latch 54 will remain set, and the phase error signal will continue until the end of the record block. If, on the other hand, no parity error is detected during the interval, then the phase error latch 54 is reset and the phase error signal disappears. In effect, this causes the override signal to come back on as AND gate 32 is again satisfied when the phase-error signal goes away and latch 34 is set. The effect if a phase error is detected is to raise the threshold to the 10 percent level for several bit periods. If a parity error is detected during this interval, then the threshold is held up at 10 percent level for the remainder of the record block. However, if no parity error is detected during the interval, then the effective threshold again drops back to zero because the override signal comes on again.

The resetting of the latch 54, if no parity error exists during the predetermined interval, is accomplished by enabling AND gate 56. AND gate 56 functions to sample the output of latch 58 at the end of the interval. This interval is specified by the single shot 60 operating in conjunction with a pulse generator 62. The pulse generator 62 generates a pulse upon the occurrence of the trailing edge of the signal from the single shot 60. This pulse from the pulse generator 62 enables AND gate 56, which then tests or samples the output from latch 58. If latch 58 is reset, AND gate 56 will have an output which is passed by OR 64 to reset the phase error latch 54. Latch 58 in initially reset at the end of the previous record block. If the combination of a phase error and parity error exists in the present record block, then latch 58 will be set because AND gate 46 will have an output. The output of AND gate 46 then causes the reset side of latch 58 to be turned off. When the AND gate 56 is enabled by the pulse from pulse generator 62, the other side of the AND gate 56 is not satisfied, and, thus, latch 54 remains set. Accordingly, with latch 54 remaining set, the phase error signal will be present for the remainder of the record block, and, thus, the override signal for that zone of three tracks will be nonexistent for the remainder of the record block, and the amplitude sensor 14 in the tape drive will remain effective and operating at the 10 percent threshold level. Resetting of the apparatus in FIG. 1 is accomplished by developing a reset signal after the end of each record block. These reset signals are applied directly to latches 42, 48 and 58, and indirectly to latches 34 and 54 via OR gates 40 and 64. The manner of generation of the reset signal is a matter of choice and forms no part of the invention. One possibility would be to monitor the data to detect the end of a record block and, thereupon, generate the reset signal.

Figure 2:
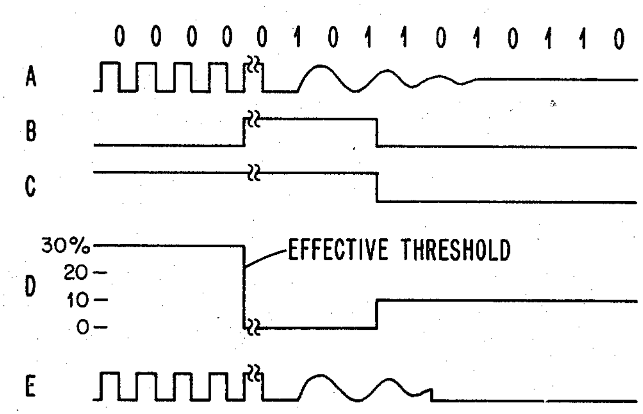
FIG. 2 shows some waveforms present in the apparatus of FIG. 1.

In FIG. 2, some waveforms are shown which would exist in the apparatus of FIG. 1 in a situation where a good data indication is initially detected. Later, during the data the amplitude of the digital signal from the amplifier 12 begins to deteriorate. As previously pointed out, when the amplitude of the digital signal deteriorates, the digital signal, which is really a hard-limited signal, reverts back to an analog signal. Such a signal is shown as waveform A in FIG. 2. The signal is basically phase-encoded data where a positive going transition in the middle of a bit cell represents a one, and a negative going transition in the middle of the bit cell represents a zero. The preamble, as previously pointed out, consists of 40 consecutive zeros followed by a one indicating the beginning of data in the record block.

The first four bits of this preamble are shown in waveform A of FIG. 2. Since the zero bits are all of good amplitude, the effect in the tape control unit will be to satisfy the envelope amplitude sensor 30 after approximately four consecutive zeros. With the envelope amplitude sensor satisfied, the override latch 34 becomes set, and the override signal for that zone comes on. This assumes that the other signals in the tracks of that zone were also good amplitude. The override signal is shown as waveform B in FIG. 2. When the override signal comes on, it effectively reduces the threshold used by the amplitude sense and data gate 20 to zero level, as shown in waveform B, of FIG. 2.

As depicted in waveform A, the data begins to deteriorate immediately after entering the record data portion of the record block. The amplitude of the signal is deteriorating to a point where it no longer looks like a digital signal and begins to appear as a low amplitude analog signal. It is assumed that the data error detector 24 in the tape control unit will probably be able to properly identify the data up to about the second bit after the one-bit signal indicating the end of the preamble. At this point, the data detector 28 will probably indicate a phase error. In other words, the lack of amplitude causes the data detector to start indicating phase error. When the phase error signal occurs, the override latch 34 is thus reset and the override signal no longer exists. Simultaneously, the latch 42 is set by the error signal, and the threshold used by the amplitude sensor 14 is switched from the high level to the low level (waveform C in FIG. 2). The effective threshold as shown in waveform D then goes to the 10 percent level.

With the amplitude sensor now back into effective operation with the data gate 16, data gate 16 will remain enabled only so long as the input waveform satisfies the 10 percent threshold. It is assumed in the waveform A that at approximately the fourth bit after the beginning of data in the record block, the amplitude no longer satisfies the 10 percent threshold. This causes the AND gate 16 to block further passage of data to the tape control unit. Waveform E indicates the output or gated digital signal from the AND gate 16. Notice that waveform E is identical to waveform A until the point where during 10 percent threshold the amplitude sensor shuts down the AND gate 16. At this point, no further data signal is passed to the tape control unit.

Figure 3:
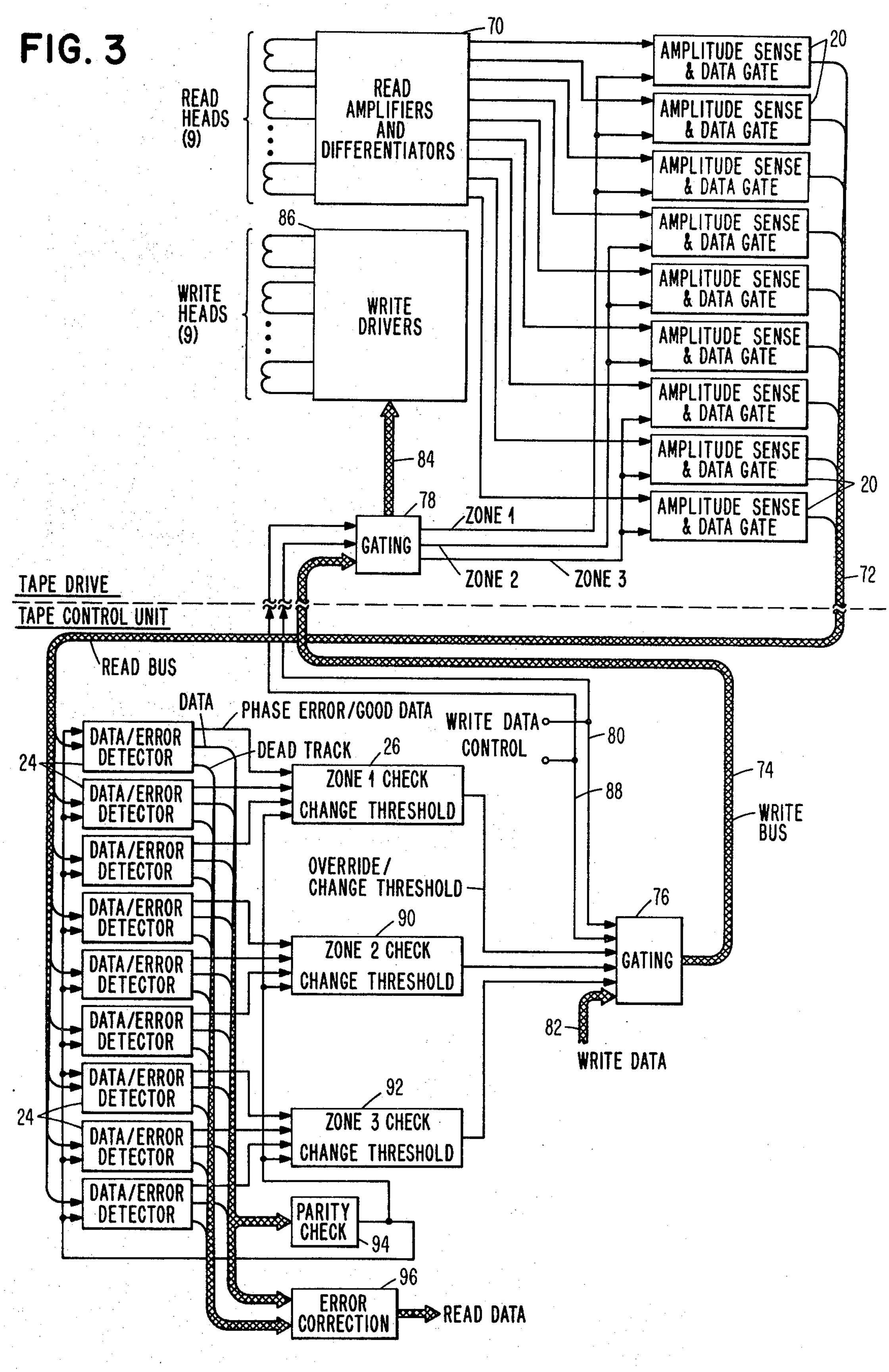
FIG. 3 shows the channeling of data and control signals between the tape drive and the tape control unit wherein there are nine read/write tracks in the tape drive and a zone check and zone control with three tracks per zone.

In FIG. 3, the utilization of the invention is shown in an environment where there are nine read/write tracks and a zone check and zone control is applied in three zones with three tracks per zone. The read amplifiers and differentiators have been lumped into a single block 70 for all of the nine read heads. Of course, these is one read amplifier and differentiator for each head as depicted in FIG. 1. The amplitude sense and data gate circuits 20 are each responsive to its associated read amplifier and differentiator. The other input into the amplitude sense and data gates 20 are the zone control signals received from the tape control unit. As shown in FIG. 1, the amplitude sense and data gate for each track receives two control signals. However, for simplicity of illustration, these two lines have been lumped into a single line for purposes of FIG. 3. In any event, a single line could be used if it had multiple signals on it to provide the multiple control functions necessary.

The gated digital data signal out of the amplitude sense and data gates 20 are collected into a cable of nine lines which constitutes the read bus that carries the digital signal from the tape drive to the tape control unit. The control signals for the different zones are received by the tape drive through the write bus 74 from the tape control unit. Thus, the write bus serves the dual purpose of carrying the write data to the tape drive when data is being recorded and carrying the control signals to the tape drive when data is being read. The gating of write data or control signals onto the write bus is controlled by the gating logic blocks 76 in the control unit and 78 in the tape drive. When it is desired to write data, the control unit enables the write data line 80. This write data line enables AND gates in the gating blocks 76 and 78 which then connect the write data from cable 82 onto cable 74 and to cable 84 in the tape drive. Cable 84 connects the write data to the write drivers 86, which drives the write heads.

When data is being read, the control unit enables the control line 88 which enables gates in the gating circuits 76 and 78 to connect zone-check signals and change-threshold signals onto the write bus 74. The zone-check and change-threshold signals are from the zone check blocks 26, 90, and 92. Zone check-block 26 has previously been described in FIG. 1. The control signals for zones 1, 2, and 3 from each of these zone-check blocks are applied to different lines on the write bus and passed to the tape drive. The gating logic 78 in the tape drive being enabled by the signal on line 88 then distributes the zone-check signals to the appropriate groups of three amplitude sense and data gates 20. Thus, as previously pointed out in FIG. 1, the control functions flowing between the amplitude sense and data gate in the tape drive and the zone-check circuits in the control are based on zone operation where there are three tracks per zone.

Just as in FIG. 1, each zone check receives its input signals from a data error detector in the tape control unit. The input signals to the zone check are the phase error signals from the three tracks in the zone and the parity error signal from the parity check circuit 94. As is well known, the parity check circuit monitors an entire byte of data and indicates an error when the parity bit does not agree with the parity for the byte.

The data from the data error detectors 24 is passed to the parity check 94 for the parity check operation and to the error correction block 96 for error correction if required. To permit error correction, the error correction block must also receive the dead track information from the respective data error detectors for each track and the parity bit for each byte. The error correction circuit 96 is not shown in detail; it does not form a part of the invention. Error correction can be simply achieved for single track errors by using the parity bit and the information of which track is dead to correct the bit in that dead track. If there are multi-track errors, then error correction by using the parity bit alone is not possible. Also, the error correction circuit 96 will have to have some buffering or data storage to give it the opportunity to combine the dead track information with the parity bit information.

FIG. 3 has thus shown how the invention might be implemented with nine read/write tracks and providing a zone check of three tracks per zone. It will be appreciated that the check could be on a track-by-track basis, or the zone could be of any size desired.

Figure 4:
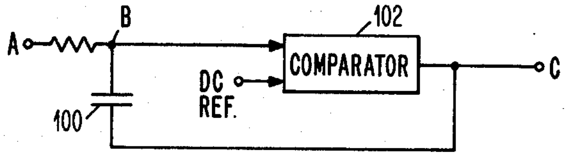
FIG. 4 shows an implementation of the envelope amplitude sensor used in the control unit as shown in FIG. 1.
Figure 5:
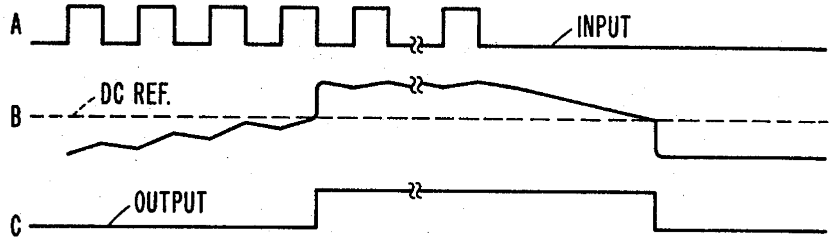
FIG. 5 shows the waveforms present in the envelope amplitude sensor of FIG. 4.

Returning now to the details of the apparatus in FIG. 1, the envelope amplitude sensor of FIG. 1 is shown in FIG. 4 with the waveforms associated with it shown in FIG. 5. In operation, the digital signal received from the tape drive is applied at the input terminal, FIG. 4, shown as waveform A in FIG. 5. This signal causes capacitor 100 to charge during each up-level of the waveform A. For a down level, the capacitor 100 will start to discharge. A series of zeros in phase-encoded data, as is the case in the preamble, will cause capacitor 100 to build up a charge. After about four zero bits in the preamble, the charge on the capacitor 100 will be such that the voltage applied to the comparator 102 will be greater than the DC reference also being applied to the comparator. Waveform B shows the voltage on the capacitor relative to the DC reference used by the comparator 102. When the voltage on the capacitor exceeds the DC reference, the comparator has an up-level output as shown by waveform C. This waveform C is the good data indication used in FIG. 1 as the output of the envelope amplitude sensor.

When the comparator 102 has the up-level output, it is fed back to the capacitor 100. This feedback effectively jumps the voltage of waveform B up a step increment and tends to latch the circuit. Waveform B will stay at a high level above the DC reference, unless the amplitude of the input signal at waveform A gradually decreases or unless waveform A terminates. When waveform A terminates, the capacitor 100 begins to discharge and will eventually reach the DC reference level of the comparator 102. At this point, comparator 102 turns off its output, and the voltage on waveform B then drops down well below the DC reference level.

Figure 6:
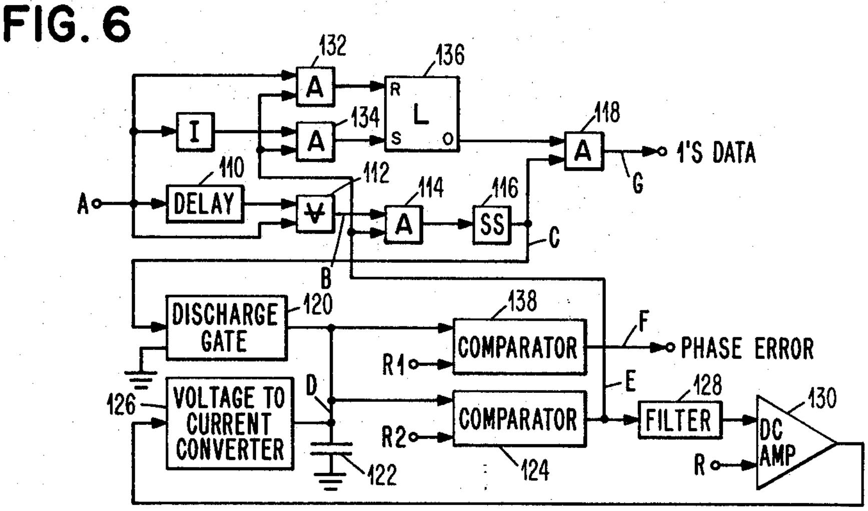
FIG. 6 shows the data detector used in the control unit as shown in FIG. 1.

In FIG. 6, the detailed implementation of the data detector of FIG. 1 is shown. Waveforms which exist in the data detector of FIG. 6 are shown in FIG. 7.

Figure 7:
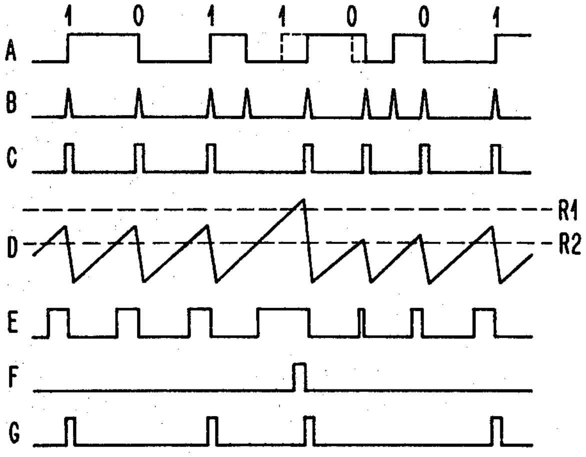
FIG. 7 shows waveforms present in the data detector of FIG. 6.

Waveform A of FIG. 7 is the gated digital signal from the drive. It is applied at the input of the data detector at the point correspondingly labeled "A." The digital signal is converted into a pulse signal for each transition by delay 110 and exclusive OR 112. The duration of the pulses in waveform B is controlled by the length of the delay. The transition pulses in waveform B are then ANDed with clock pulses, shown as waveform E. The generation of the clock pulses E will be discussed hereinafter. The result is that the phase transitions are removed from the waveform B, and only data transitions are passed by AND gate 114 to a single shot 116.

Single shot 116 then generates a pulse for each pulse it receives with the duration of the output pulses from the single shot being fixed by the period of the single shot. The single shot output then represents data transition pulses, and the pulses are of a fixed duration. These pulses are passed to the AND gate 118 where they are used to indicate one's data, as will be explained hereinafter. The data transition pulses are also passed to a discharge gate 120.

The discharge gate 120, in combination with the capacitor 122 and comparator 124, is used to generate the clock or gating signals shown as waveform E. Capacitor 122 generates a sawtooth waveform D because it is charged by a current from voltage-to-current converter 126 and discharged by discharge gate 120. Each time a data transition pulse in waveform C occurs, the discharge gate fires and discharges the capacitor 122. As soon as the pulse in waveform C terminates, the voltage-to-current converter 126 then proceeds to recharge capacitor 122. The resulting waveform D is compared with a reference level R2 (shown in waveform D, FIG. 7). Each time the sawtooth waveform exceeds the R2 reference, the comparator 124 has an output. This output is indicated in waveform E.

To control the voltage-to-current converter 126, the waveform E is passed through a filter 128 to a DC amplifier 130. Filter 128 acts to convert the waveform E into an average DC level which is then applied to the DC amplifier 130. The output of the DC amplifier represents the difference between a reference voltage and the voltage from the filter 128. This output is fed back to the voltage-to-current converter 126. As the output voltage from filter 128 rises, the charging slope of capacitor 122 is decreased, while if the voltage out of filter 128 decreases, the slope of the voltage waveform D, indicating the charging of capacitor 122, increases.

Waveform E is also fed back to AND gates 132 and 134, and these AND gates serve to sample the waveform A just prior to a data transition. If waveform A is down just before a data transition, then latch 136 will be reset when a voltage pulse on waveform E occurs. If waveform A is at an up-level just before data transition, then, when waveform E pulse occurs, the latch 136 will be set. Since a transition from a low level to an up level corresponds to a one, this means that if the latch 136 is reset just before transition, then the transition will be a one. Accordingly, the output of single shot 116 which represents data transitions is ANDed with the reset side of latch 136 by AND gate 118 to indicate one's data. As shown in waveform G, there is an output pulse corresponding in size to the data transition pulse in waveform C each time there is a binary one in the waveform A.

To detect a phase error, a second comparator, 138, with a second reference level is used. Comparator 138 also monitors the waveform D. If there is no phase error, the capacitor 122 will be discharged by data transition pulses before the charge on capacitor 122 will reach a sufficient level that the voltage will exceed the reference used by comparator 138. Reference level R1, used by comparator 138, is indicated in waveform D and constitutes about 130 percent of a nominal signal.

To show an example of phase error, the fourth bit in waveform A has been drastically shifted, and the fifth bit is somewhat shifted as the waveform has still not fully returned to its normal phase. Because the fourth bit was strongly shifted, the data transition pulse C occurs very late, and it is this pulse that fires the discharge gate 120. Accordingly, the ramp during the fourth bit runs much longer than usual and exceeds the 130 percent, or R1, threshold of comparator 138. When this occurs, comparator 138 generates an output pulse indicated by waveform F. This is the phase error pulse utilized in FIG. 1 to set the phase error latch. It is assumed in waveform A that the signal gradually recovers its phase in the next two bits, and, thus, there are no further phase error signals generated.

Applicants have particularly described a preferred data detector. However, an alternative data detector which could be used is taught in commonly assigned U.S. Pat. No. 3,401,346. This patent shows a circuit for generating a clock signal and a data signal. To generate a phase error signal, it is necessary to add a second Schmitt trigger operating off of a different voltage level to the apparatus shown in FIG. 1 of this U.S. Pat. No. 3,401,346. Of course, there are many other types of data detectors that could be used, the only requirement being that they each provide identification of data and identification of phase error.

While the invention has been particularly shown and described with reference to a preferred embodiment particularly using tape drives, it will be understood by those skilled in the art that the foregoing and other changes in form and details to adapt the invention to similarly functioning apparatus and to the environment of any moving magnetic storage medium may be made without departing from the spirit and scope of the invention.

What is claimed is:

1. In a system for reading a data signal from a magnetic-storage medium moving relative to a transducer, apparatus for controlling the gating of the data signal across an interface comprising:
- means for gating the data signal across the interface only if the strength of the data signal exceeds a gating threshold;
- first means responsive to said gating means for detecting good data in the data signal passed by said gating means;
- second means responsive to said gating means for detecting errors in the data signal passed by said gating means;
- means responsive to said first and second detecting means for adjusting the gating threshold of said gating means to a first threshold when good data is detected by said first detecting means and to a second threshold when an error in the data signal is detected by said second detecting means.

2. The apparatus of claim 1 wherein said first detecting means comprises:
- means for sensing the envelope amplitude of the data signal passed by said gating means;
- means responsive to said sensing means for generating a good data signal when the envelope amplitude sensed is indicative of a history of good data being passed by said gating means.

3. The apparatus of claim 1 wherein said second detecting means comprises:
- means for detecting a phase error in the data signal passed by said gating means.

4. The apparatus of claim 1 wherein said second detecting means comprises:
- means for detecting a parity error in the data signal passed by said gating means and generating a parity error signal;
- means for detecting a phase error in the data signal passed by said gating means and generating a phase error signal;
- means for logically combining the phase error signal and the parity error signal so that if either error condition occurs an error indication is passed to said adjusting means.

5. The apparatus of claim 1 wherein said adjusting means comprises:
- means responsive to said first detecting means for overriding the gating threshold in said gating means if good data is detected so that after good data has been detected the data signal is passed across the interface irrespective of the strength of the data signal;
- means responsive to said second detecting means for inhibiting said overriding means if an error in the data signal is detected so that the gating threshold is raised to a second threshold after an error in the data signal is detected.

6. Apparatus for controlling the passing of a data signal, read from a magnetic-storage medium, across a digital interface to a control unit, the apparatus comprising:
- means for sensing the amplitude of the data signal;
- means for gating the data signal across the digital interface to the control unit if the amplitude of the data signal exceeds a gating threshold;
- first means in the control unit responsive to said gating means for detecting a history of good data in the data signal passed by said gating means and thereafter generating an override signal;
- second means in the control unit responsive to said gating means for detecting an error in the data signal passed by said gating means and thereafter generating a change threshold signal;
- said gating means responsive to the override signal to ignore the gating threshold and to gate the data signal across the digital interface irrespective of the amplitude of the data signal;
- said first detecting means responsive to the change threshold signal to inhibit generation of the override signal;
- said gating means responsive to the change threshold signal to change the gating threshold to a level lower than the initial level used to discriminate against noise, but high enough to block a data signal of insufficient amplitude.

7. Apparatus of claim 6 wherein said second detecting means comprises:
- means responsive to said gating means for detecting parity error in the data signal and generating a parity error signal for the byte of data in error;
- means responsive to said gating means for detecting phase error in the data signal and generating a phase error signal for the track having a phase error;
- means responsive to the phase error signal or the parity error signal for generating a change threshold signal.

8. The apparatus of claim 7 and in addition:
- means for logically combining the parity error signal for the byte and the phase error signal for a track and thereby detecting that the track having the phase error is a dead track.

9. The apparatus of claim 7 and in addition:
- means responsive to said gating means for detecting an amplitude error in the data signal and generating an amplitude error signal for the track in error;
- means for logically combining the parity error signal and the amplitude error signal and thereby detecting that the track having the amplitude error is a dead track.

10. Method for controlling the passage of a data signal read from a magnetic-storage medium across an interface comprising the steps of:
- first passing the data signal across the interface so long as the data signal has a predetermined strength, until a history of good data signals is built up and,
- subsequently passing the data signal irrespective of the strength of the data signal until an error in recognition of data in the data signal is detected and, thereafter passing the data signal only if the data signal has at least a minimum strength.

11. The method of claim 10 wherein said first passing step comprises the steps of;

blocking the data signal from transmission across the interface if the data signal is below a predetermined energy level;

monitoring the data signal transmitted across the interface for a history of good data.

12. The method of claim 11 wherein said subsequently passing step comprises the steps of:

transmitting the data signal across the interface irrespective of its energy content after a history of good data has been detected by said monitoring;

checking for phase error or parity error in the data signal transmitted across the interface;

said transmitting step ceasing when said checking step detects an error in the data signal.

13. In an information processing system, apparatus for controlling the passage of an information signal through an information channel comprising:

means for sending the information signal through the channel only if the strength of the information signal satisfies a predetermined level;

first means responsive to the information signal sent by said sending means for sensing a history of consistently strong information signals;

second means responsive to the information signal sent by said sending means for sensing a fault in the information signal;

means responsive to said first and second sensing means for changing the satisfaction level of said sending means to a first level when a history of strong signals is sensed and to a second level when a fault in the information signal is sensed.

14. The apparatus of claim 13 wherein said sending means comprises:

means for monitoring the energy of the information signal;

means responsive to said monitoring means for gating the information signal into the information channel for passage therethrough if the energy in the information signal is above a predetermined level.

15. The apparatus of claim 13 wherein said sending means comprises:

means for detecting the amplitude of the information signal;

means responsive to said detecting means for gating the information signal into the information channel for passage therethrough if the amplitude of the information signal is above a predetermined level.

16. The apparatus of claim 13 wherein said changing means comprises:

means responsive to said first sensing means for reducing the satisfaction level of said sending means to zero so that, after a history of strong signals has been sensed, the information signal is sent through the channel irrespective of the strength of the information signal;

means responsive to said second sensing means for disabling said reducing means if a fault in the information signal is sensed so that the satisfaction level is increased to a second level after a fault is sensed.

* * * * *